United States Patent
Kim et al.

(10) Patent No.: US 11,483,392 B2
(45) Date of Patent: Oct. 25, 2022

(54) NETWORK SERVER COMMUNICATING WITH PLURALITY OF USER TERMINALS OVER NETWORK AND OPERATION METHOD THEREOF

(71) Applicant: NHN CORPORATION, Gyeonggi-do (KR)

(72) Inventors: Sung Jun Kim, Gyeonggi-do (KR); Cheol Won Jang, Gyeonggi-do (KR); Han Sol Jung, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 245 days.

(21) Appl. No.: 16/999,066

(22) Filed: Aug. 21, 2020

(65) Prior Publication Data
US 2021/0058491 A1  Feb. 25, 2021

(30) Foreign Application Priority Data
Aug. 21, 2019  (KR) .................. 10-2019-0102038

(51) Int. Cl.
*H04L 67/131* (2022.01)
*H04L 67/303* (2022.01)
(Continued)

(52) U.S. Cl.
CPC .......... *H04L 67/131* (2022.05); *G06K 9/6215* (2013.01); *H04L 63/1416* (2013.01);
(Continued)

(58) Field of Classification Search
CPC ..... H04L 67/131; H04L 67/01; H04L 67/535; H04L 63/1416; H04L 63/1425; H04L 67/303
See application file for complete search history.

(56) References Cited

U.S. PATENT DOCUMENTS 9,781,478 B2 * 10/2017 Klarfeld ............ H04N 21/4334
10,790,054 B1 * 9/2020 Vleugels ............... A61B 5/1114
(Continued)

FOREIGN PATENT DOCUMENTS

KR   10-2011-0067630   6/2011
KR   10-1791951        11/2017
KR   10-1915802        11/2018

OTHER PUBLICATIONS

Office Action for Korean Patent Application No. 10-2019-0102038 dated Aug. 11, 2020 and its English machine translation by Google Translate.

*Primary Examiner* — Minh Chau Nguyen
(74) *Attorney, Agent, or Firm* — Ladas & Parry, LLP

(57) ABSTRACT

A network server communicating with a plurality of user terminals over a network includes a communicator and at least one processor configured to communicate with the plurality of user terminals through the communicator. The at least one processor obtains an event history including information on user input events of each of the plurality of user terminals by communicating with each of the plurality of user terminals through the communicator, determines a macro score corresponding to each of the plurality of user terminals based on each of the event histories of the plurality of user terminals, adjusts a reference value for detecting whether a macro is used, based on the macro scores corresponding to the plurality of user terminals, and detects whether each of the plurality of user terminals uses the macro, by comparing each of the macro scores corresponding to the plurality of user terminals with the reference value.

16 Claims, 11 Drawing Sheets

(51) Int. Cl.
*H04L 9/40* (2022.01)
*H04L 67/01* (2022.01)
*H04L 67/50* (2022.01)
*G06K 9/62* (2022.01)

(52) U.S. Cl.
CPC .......... *H04L 63/1425* (2013.01); *H04L 67/01* (2022.05); *H04L 67/303* (2013.01); *H04L 67/535* (2022.05)

(56) References Cited

U.S. PATENT DOCUMENTS

2008/0126828 A1* 5/2008 Girouard ............. G06F 11/3644
714/E11.178
2015/0363478 A1* 12/2015 Haynes ................. G06Q 10/06
707/610

* cited by examiner

NETWORK SERVER COMMUNICATING WITH PLURALITY OF USER TERMINALS OVER NETWORK AND OPERATION METHOD THEREOF

BACKGROUND

1. Technical Field

The present disclosure generally relates to a network system, and more particularly, to a network server communicating with a plurality of user terminals over a network and an operation method thereof.

2. Related Art

With the recent development of the data communication network, many people use the Internet. Various types of services using the Internet, for example, services such as a messenger, an online shopping mall and online game are provided along with an increase in the use of the Internet. Among the various services, in particular, in the game service field, the development speed and supply speed of the game service suddenly increase. Accordingly, many Internet users use online game services of various methods using the Internet. The game service is developing from the existing method in which games are executed offline in a personal computer or game control to online games which users can enjoy accessing a game server through the Internet including a mobile communication network.

As the game services are widely spread or used as described above, a security problem may become a serious issue. Such a security issue includes protecting personal information and cyber assets of a user against various fraudulent acts and hacking. A macro in the game service may include a program that provides user input events in response to predetermined commands, and may be supplied in various forms, such as an application. A user who uses a macro can play a game without being limited to time, and thus can rapidly obtain various objects, such as cyber assets including game items and game money and experience points given as a reward for the accomplishment or success of a mission, compared to other users who do not use the macro. In addition, various imbalances between a normal user who does not use the macro and a user who uses the macro may cause the normal user to relatively feel deprived and stop playing games and may break the balance between users who play the game together.

The aforementioned contents are provided to merely help understanding of the background technology of technical spirit of the present disclosure. Accordingly, the aforementioned contents cannot be understood as contents corresponding to a prior art known to those skilled in the art to which the present disclosure pertains.

SUMMARY

Various embodiments are directed to a network server having enhanced reliability in determining one or more user terminal using a macro among user terminals using a game service, and an operation method thereof. For example, the network server and the operation method thereof determine a reference value adaptive to macro scores which may variously change depending on users and determine a macro user based on the determined reference value.

In an embodiment, a network server communicating with a plurality of user terminals over a network may include a communicator and at least one processor configured to communicate with the plurality of user terminals through the communicator The at least one processor may obtain an event history including information on user input events of each of the plurality of user terminals by communicating with each of the plurality of user terminals through the communicator, determine a macro score corresponding to each of the plurality of user terminals based on each of the event histories of the plurality of user terminals, adjust a reference value for detecting whether a macro is used, by performing an operation using the macro scores, and detect whether each of the plurality of user terminals uses a macro, by comparing each of the macro scores with the reference value.

The at least one processor may determine, as the reference value, a value to minimize the sum of differences between the macro scores.

The macro scores may include first to n-th macro scores. The at least one processor may determine the reference value by computing an equation $$MD = \sum_{i=1}^{n} |xi - v|$$

where the MD indicates a macro distance, the xi indicates the i-th macro score, the v indicates a variable, the n is an integer greater than or equal to 1, and the i is an integer greater than or equal to 1 or smaller than or equal to the n. The variable to minimize the macro distance may be determined as the reference value.

The at least one processor may detect that the macro has been used in a user terminal corresponding to a macro score greater than the reference value among the macro scores.

The information on the user input events may include touch coordinates and hold times of the user input events.

The at least one processor may determine the macro score corresponding to each of the user terminals based on a ratio of redundancy of the information on the user input events of each of the user terminals obtained from each of the event histories.

The at least one processor may obtain coordinates of the user input events of each of the user terminals from each of the event histories and determine the macro score corresponding to each of the user terminals based on redundant coordinates among the obtained coordinates.

The plurality of user terminals may include first to n-th user terminals. The macro scores may include first to n-th macro scores. The at least one processor may determine the j-th macro score of the j-th user terminal by computing an equation $$MSj = \frac{DPj}{DFj/NUIj}$$

where the n is an integer greater than or equal to 1, the j is an integer greater than or equal to 1 or smaller than or equal to the n, the MSj indicates the j-th macro score, the DPj indicates the number of coordinates most redundant among coordinates of user input events of the j-th user terminal, the DFj indicates the number of different coordinates among the coordinates of the user input events of the j-th user terminal, and the NUIj indicates the number of user input events of the j-th user terminal.

In an embodiment, a network server communicating with a plurality of user terminals over a network may include a communicator and at least one processor configured to communicate with the plurality of user terminals through the communicator. The at least one processor may obtain an event history including information on user input events of each of the plurality of user terminals, determine a macro score corresponding to each of the plurality of user terminals based on each of the event histories of the plurality of user terminals, adjust a reference value for detecting whether a macro is used, with reference to a distribution of the macro scores, detect whether each of the plurality of user terminals uses a macro, by comparing each of the macro scores with the reference value.

The at least one processor may determine, as the reference value, a value to minimize the sum of differences between the macro scores.

In an embodiment, an operating method of a network server communicating with a plurality of user terminals over a network may include obtaining an event history including information on user input events of each of the plurality of user terminals by communicating with each of the plurality of user terminals over the network, determining a macro score corresponding to each of the plurality of user terminals based on each of the event histories of the plurality of user terminals, adjusting a reference value for detecting whether a macro is used, by performing an operation using the macro scores, and detecting whether each of the plurality of user terminals uses a macro, by comparing each of the macro scores with the reference value.

The adjusting of the reference value may include determining, as the reference value, a value to minimize the sum of differences between the macro scores.

The macro scores may include first to n-th macro scores. The adjusting of the reference value may include computing an equation $$MD = \sum_{i=1}^{n} |xi - v|$$

where the MD indicates a macro distance, the xi indicates the i-th macro score, the v indicates a variable, the n is an integer greater than or equal to 1, and the i is an integer greater than or equal to 1 or smaller than or equal to the n. The variable to minimize the macro distance may be determined as the reference value.

The detecting of whether the macro is used may include detecting that the macro has been used in a user terminal corresponding to a macro score greater than the reference value among the macro scores.

The information on the user input events may include touch coordinates and hold times of the user input events.

The determining of the macro score may include determining the macro score corresponding to each of the user terminals based on a rate of redundancy of the information on the user input events of each of the user terminals obtained from each of the event histories.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Hereinafter, various examples of embodiments will be described in detail with reference to the accompanying drawings. In the following description, it is to be noted that only a part necessary to understand an operation according to an embodiment of the present disclosure is described and descriptions of the other parts will be omitted in order not to obscure the subject matter of the present disclosure. Furthermore, the present disclosure may be materialized in other forms without being limited to embodiments described hereinafter. Furthermore, the following embodiments are provided to describe the present disclosure in detail to the extent that a person having ordinary skill in the art to which the present disclosure pertains may readily carry out the technical spirit of the present disclosure.

In the entire specification, when it is described that one part is "connected" to the other part, the one part may be "directly connected" to the other part or may be "indirectly connected" to the other part with a third part interposed therebetween. The terms used herein are for describing specific embodiments and are not intended to limit the present disclosure. In the entire specification, when it is said that one part "include" any element, the word "include" means the further inclusion of other elements, not the exclusion of other elements, unless explicitly described to the contrary.

"At least any one of X, Y, and Z", and "at least any one selected from a group consisting of X, Y, and Z" may be understood as X, Y, Z, or any combination of two or more of X, Y, and Z (e.g., XYZ, XYY, YZ or ZZ). In this case, "and/or" includes one of corresponding elements or all combinations of the corresponding elements.

Figure 1:
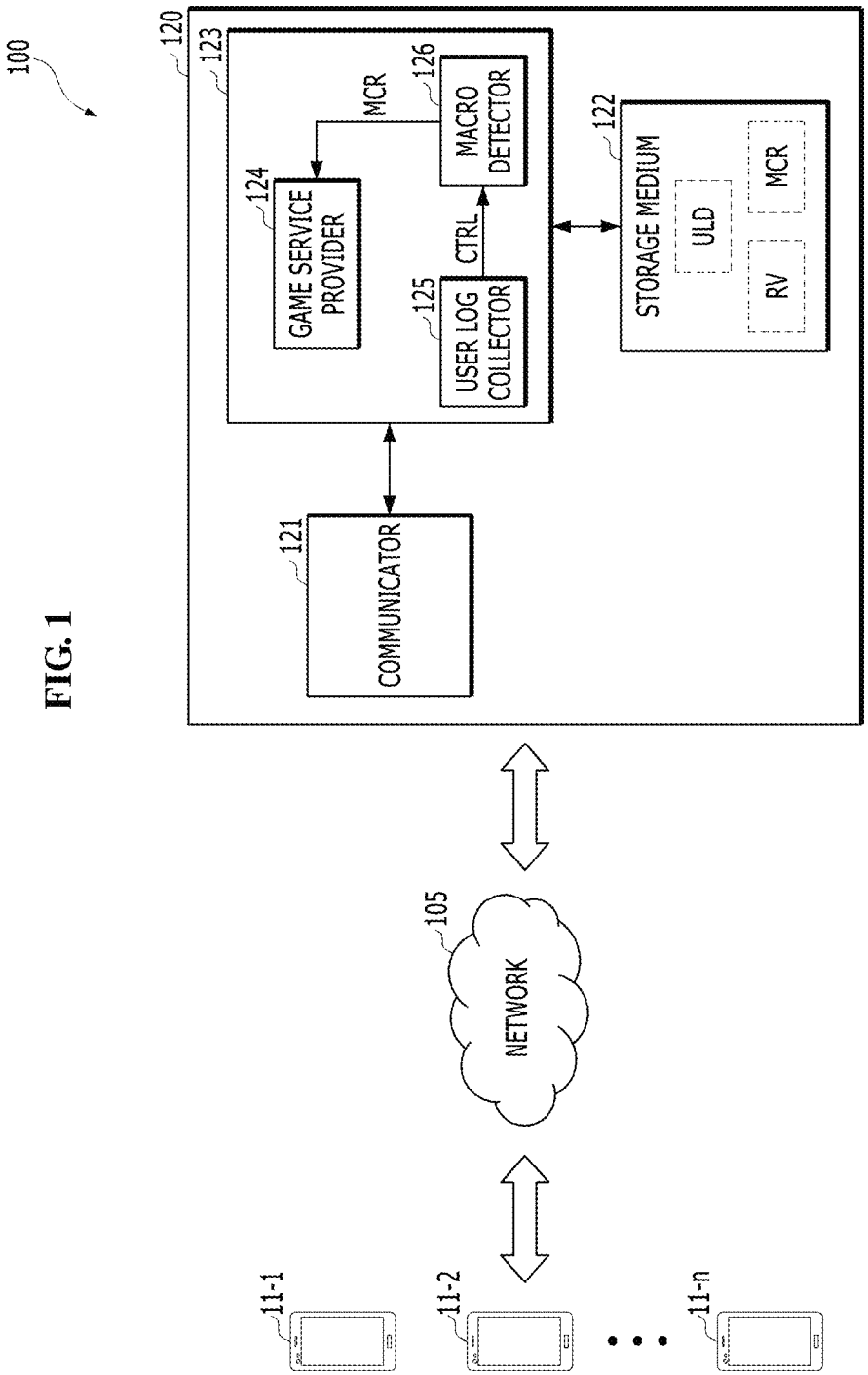
FIG. 1 is a block diagram illustrating a network system according to an embodiment of the present disclosure.
Figure 2:
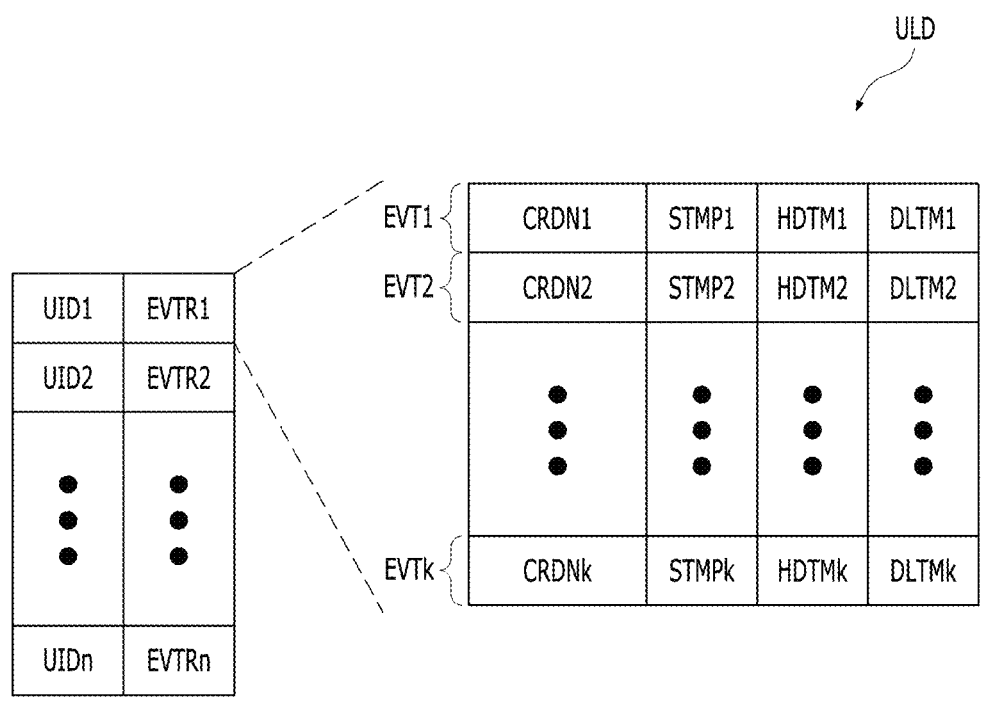
FIG. 2 is a conceptual diagram illustrating an example of user log data in FIG. 1.

FIG. 1 is a block diagram illustrating a network system 100 according to an embodiment of the present disclosure. FIG. 2 is a conceptual diagram illustrating an example of user log data in FIG. 1.

Referring to FIG. 1, the network system 100 may include a network 105, first to n-th user terminals 11-1 to 11-*n* (n is an integer greater than 1), and a game server 120.

The network system 100 may include a plurality of devices, servers and/or software elements configured to operate to perform various methods according to the following embodiments of the present disclosure. The devices and/or servers illustrated in FIG. 1 may be configured in different manners. Operations and services provided by the devices and/or the servers may be combined or separated for the embodiments described herein and may be performed by a more or fewer number of devices and/or servers. One or more devices and/or servers may be driven and/or maintained by the same or different companies.

The network 105 connects the first to n-th user terminals 11-1 to 11-*n* and any devices or elements within the network system 100, such as the game server 120. For example, the network 105 may include at least one of a public network, at least one private network, a wired network, a wireless network, another proper type of network, and combinations thereof. Each of the devices or elements within the network system 100 may have at least one of a wired communication function and a wireless communication function, and thus the devices or elements within the network 105 may communicate with each other over the network 105.

The first to n-th user terminals 11-1 to 11-*n* may communicate with the game server 120 over the network 105. Each of the first to n-th user terminals 11-1 to 11-*n* may include a game application. After a user ID is generated through communication with the game server 120, the game application may access the game server 120 using the user ID and perform operations or actions for a game service. The game application of each user terminal 11-1, . . . , 11-*n* may receive a user input event from a user through a user interface provided by the game application. For example, the user terminal 11-1, . . . , 11-*n* may detect various types of user input events, for example, but not limited to, a touch, touch and hold, a drag, and a drag and drop. The game application of the user terminal 11-1, . . . , 11-*n* may perform a proper or corresponding operation or action in response to a received user input event. For example, the game application of the user terminal 11-1, . . . , 11-*n* may transmit, to the game server 120, a request signal corresponding to, or based on, a received user input event, may receive, from the game server 120, a feedback signal responding or corresponding to the request signal, and may output or display a proper or corresponding graphic interface in response to the feedback signal, thereby support the game service.

In an embodiment, each of the user terminals 11-1 to 11-*n* may include one or more devices capable of transmitting and receiving information or data in a wired and/or wireless environment, such as a computer, an ultra mobile personal computer (UMPC), a workstation, a netbook, a personal digital assistants (PDA), a portable computer, a web tablet, a wireless phone, a mobile phone, a smart phone, an e-book, a portable multimedia player (PMP), and a portable game machine.

The game server 120 may be provided as a network server, and may provide a game service through communication with the first to n-th user terminals 11-1 to 11-*n* over the network 105. Furthermore, the game server 120 may receive data or information on user input events from the first to n-th user terminals 11-1 to 11-*n*, and may detect a user terminal that uses a macro, based on the received user input events.

The game server 120 may include a communicator 121, a storage medium 122, and a controller 123.

The communicator 121 may be configured to provide communication between the controller 123 and the network 105. The communicator 121 may transmit or output, to the controller 123, data and/or a signal received from the outside of the game server 120 (e.g. an external device connected to the game server 120 through the network 105), and may transmit, to the outside of the game server 120, data and/or a signal received from the controller 123.

The storage medium 122 may operate under the control of the controller 123. The storage medium 122 may be configured to store user log data ULD, a reference value RV, and macro user information MCR under the control of the controller 123. In embodiments, the storage medium 122 may include at least one of a random access memory (RAM), a read only memory (ROM), a flash memory, a hard disk, and a medium readable by another type of computer. For example, the storage medium 112 may be a transitory or non-transitory computer readable medium.

In FIG. 1, the storage medium 122 has been illustrated as an element included in the game server 120, but embodiments of the present disclosure are not limited thereto. For example, at least some of the storage medium 122 may be provided to the outside of the game server 120. In this case, the controller 123 may read data from the storage medium 122 and write data to the storage medium 122 through the communicator 121.

The controller 123 may be configured to control overall operations of the game server 120. In the embodiment of FIG. 1, the controller 123 may include a game service provider 124, a user log collector 125, and a macro detector 126. One or more of the game service provider 124, the user log collector 125, and the macro detector 126 may refer to a hardware based unit, a software based unit or a combination of hardware and software. The hardware based unit may include self-contained components such as chipsets, specialized circuitry and one or more memory devices, while the software-based unit may be part of a program code or linked to the program code containing specific programed instructions, which may be loaded in memory. The game service provider 124, the user log collector 125, and the macro detector 126 (whether hardware, software, or a combination thereof) may be designed to implement or execute one or more particular functions or routines. For example, the game service provider 124, the user log collector 125, and the macro detector 126 may be implemented as a processor.

The game service provider 124 may provide a game service to the first to n-th user terminals 11-1 to 11-*n* through communication with the first to n-th user terminals 11-1 to 11-*n* over the network 105. For example, the game service provider 124 may provide a feedback signal in response to a request signal received from one or more of the first to n-th user terminals 11-1 to 11-*n*. For example, the storage medium 122 may store various objects, such as items, icons, images and text associated with the game service, and a graphic interface source including layouts. The game service provider 124 may provide a proper graphic interface to each of the first to n-th user terminals 11-1 to 11-*n* based on such a graphic interface source.

The game applications of some of the first to n-th user terminals 11-1 to 11-*n* may receive user input events based on a macro (or macro program), and may operate in response to such user input events. The macro may mean a single instruction that expands automatically into a set of instructions to perform a particular task. The macro may also mean a module capable of generating user input events on behalf of a person, and may be included in a corresponding user terminal in various forms. Such a macro may include instructions that repeatedly generate a series of user input events, and may generate the user input events by performing such instructions. The instructions that repeatedly generate the series of user input events may be set by a user. Accordingly, the user input events based on such instructions may variously change. A user who uses a macro can play a game without being limited to time, and thus can rapidly obtain various objects of the game, such as cyber assets including game items and game money, and experience points given as a reward for the accomplishment or success of a mission, compared to a normal user who does not use the macro. In addition, various imbalances between the normal user and a user who uses the macro may cause the normal user to relatively feel deprived and break the balance between users who play the game together. Accordingly, it may be required to detect whether each of the first to n-th user terminals 11-1 to 11-n uses the macro.

The user log collector 125 may store, in the storage medium 122, user log data ULD based on data received from the first to n-th user terminals 11-1 to 11-n through the communicator 121. The user log collector 125 may receive information on a user input event (hereinafter referred to as a "user input event unit") from each of the first to n-th user terminals 11-1 to 11-n, and may include the user input event units of each of the user terminals 11-1 to 11-n in the user log data ULD.

For example, referring to FIG. 2, the user log data ULD may include first to n-th user identifiers UID1 to UIDn corresponding to the first to n-th user terminals 11-1 to 11-n, respectively, and first to n-th event histories EVTR1 to EVTRn corresponding to the first to n-th user identifiers UID1 to UIDn, respectively. The first to n-th event histories EVTR1 to EVTRn may be provided by the first to n-th user terminals 11-1 to 11-n, respectively.

The event history corresponding to each of the user identifiers includes a plurality of user input event units. Each of the user input event units may include various types of information capable of indicating user input events. In some embodiments, each of the user input event units may include, for example, but not limited to, the coordinates of a user input event, a timestamp on which the user input event occurred, the hold time of the user input event, and the deadline time up to the generation of a current user input event after the generation of a previous user input event. In this case, the coordinates of the user input event may include x coordinates and y coordinates. In FIG. 2, the first event history EVTR1 includes first to k-th user input event units EVT1 to EVTk. The first user input event unit EVT1 may include a first coordinate CRDN1, a first timestamp STMP1, a first hold time HDTM1, and a first deadline time DLTM1. The second user input event unit EVT2 may include a second coordinate CRDN2, a second timestamp STMP2, a second hold time HDTM2, and a second deadline time DLTM2. The k-th user input event unit EVTk may include a k-th coordinate CRDNk, a k-th timestamp STMPk, a k-th hold time HDTMk, and a k-th deadline time DLTMk. Likewise, the remaining event histories EVTR2 to EVTRn may include a plurality of user input event units.

Referring to back FIG. 1, the macro detector 126 may be configured to detect whether a macro is used in each of the first to n-th user terminals 11-1 to 11-n based on the user log data ULD. In certain embodiments, the macro detector 126 may detect whether a macro is used in each of the first to n-th user terminals 11-1 to 11-n in response to a control signal CTRL received from the user log collector 125. For example, the user log collector 125 may generate the control signal CTRL when the user log data ULD includes a predetermined number of the event histories EVTR1 to EVTRn.

The macro detector 126 may determine macro scores corresponding to the first to n-th user terminals 11-1 to 11-n, respectively, based on the event histories EVTR1 to EVTRn (refer to FIG. 2) within the user log data ULD, and may detect whether each of the first to n-th user terminals 11-1 to 11-n uses a macro, based on the determined macro scores. The macro detector 126 may store, in the storage medium 122, macro user information MCR indicative of macro users among the first to n-th user terminals 11-1 to 11-n based on a result of the detection of whether the user terminal 11-1 to 11-n uses the macro. The game service provider 124 may refer to the macro user information MCR. In some embodiments, the macro detector 126 may transmit the macro user information MCR to the game service provider 124.

The macro detector 126 may adjust a reference value RV for detecting whether a macro is used, by performing an operation using macro scores. The macro detector 126 may determine the reference value RV adaptive to a distribution of the macro scores of the first to n-th user terminals 11-1 to 11-n. The macro detector 126 may store the reference value RV in the storage medium 122, and may access the storage medium 122 and refer to the reference value RV in order to detect whether a macro is used. The macro detector 126 may detect whether each of the first to n-th user terminals 11-1 to 11-n uses a macro, by comparing each of the macro scores with the reference value RV.

A macro user, who uses a macro, may directly set user input events to be generated by a macro. Accordingly, the user input events to be generated by the macro may be variously changed. That is, a distribution of the macro scores of the first to n-th user terminals 11-1 to 11-n may be variously changed based on the setting of the macros of macro users. Accordingly, if a macro user is determined based on a predetermined reference value not adaptive to macro scores, for example, it may be difficult to precisely determine a macro user. User input events to be generated by a macro as described above may be variously changed depending on macro users, the types of macros which may be used, or the characteristics of game service. When such a possible change in macro scores is taken into consideration, the macro detector 126 may determine the reference value RV adaptive to a distribution of the macro scores, thereby having enhanced reliability in determining a macro user and improved compatibility.

In the embodiment illustrated in FIG. 1, the user log collector 125 and the macro detector 126 have been illustrated as elements of the game server 120 along with the game service provider 124. However, this is illustrative purposes only and the embodiments of the present disclosure are not limited thereto. For example, the user log collector 125 and the macro detector 126 may be included as elements of another network server outside the game server 120. In such a case, the user log data ULD, the reference value RV, and the macro user information MCR may be stored in the storage medium of the corresponding network server.

Alternatively, in some embodiments, the game service provider 124, the user log collector 125, and the macro detector 126 may be combined or separated into more elements depending on implementation examples. In certain embodiments, each of the game service provider 124, the user log collector 125 and the macro detector 126 may be implemented using at least one of hardware, firmware, software and a combination thereof.

Figure 3:
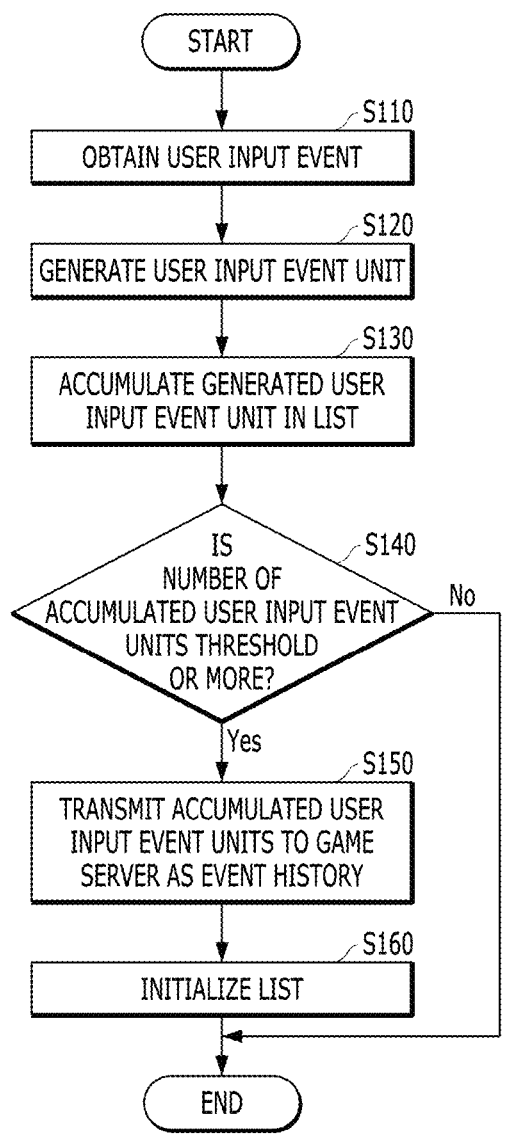
FIG. 3 is a flowchart illustrating a method of generating and providing an event history in each of user terminals according to an embodiment of the present disclosure.

FIG. 3 is a flowchart for illustrating a method of generating and providing an event history in each of the user terminals in FIG. 1 according to an embodiment of the present disclosure.

Referring to FIGS. 1 and 3, at step S110, a user terminal (e.g. first to n-th user terminals 11-1 to 11-n) receives a user input event. The game application of the user terminal may perform operations or actions for providing a game service in response to the user input event.

At step S120, the user terminal may generate a user input event unit based on the user input event received at step S110. In exemplary embodiments, the user terminal may include program codes and/or instructions for collecting a user input event in association with the game application. In exemplary embodiments, each user input event unit may include, for example, but not limited to, the coordinates of a user input event, a timestamp on which the user input event occurred, the hold time of the user input event, and the deadline time up to the generation of a current user input event after the generation of a previous user input event.

At step S130, the user terminal accumulates the user input event unit generated at step S120 in a list included in the storage medium of the user terminal. The user terminal may determine whether the number of the accumulated user input event units is equal to or more than a predetermined threshold (step S140). The user terminal may perform step S150 depending on whether the number of accumulated user input event units is a threshold or more at step S140.

At step S150, the user terminal transmits the accumulated user input event units within the list to the game server 120 as an event history. The game server 120 may include the received event history in the user log data ULD in association with the user identifier of the user terminal.

At step S160, the user terminal initializes the list including the accumulated user input event units.

Figure 4:
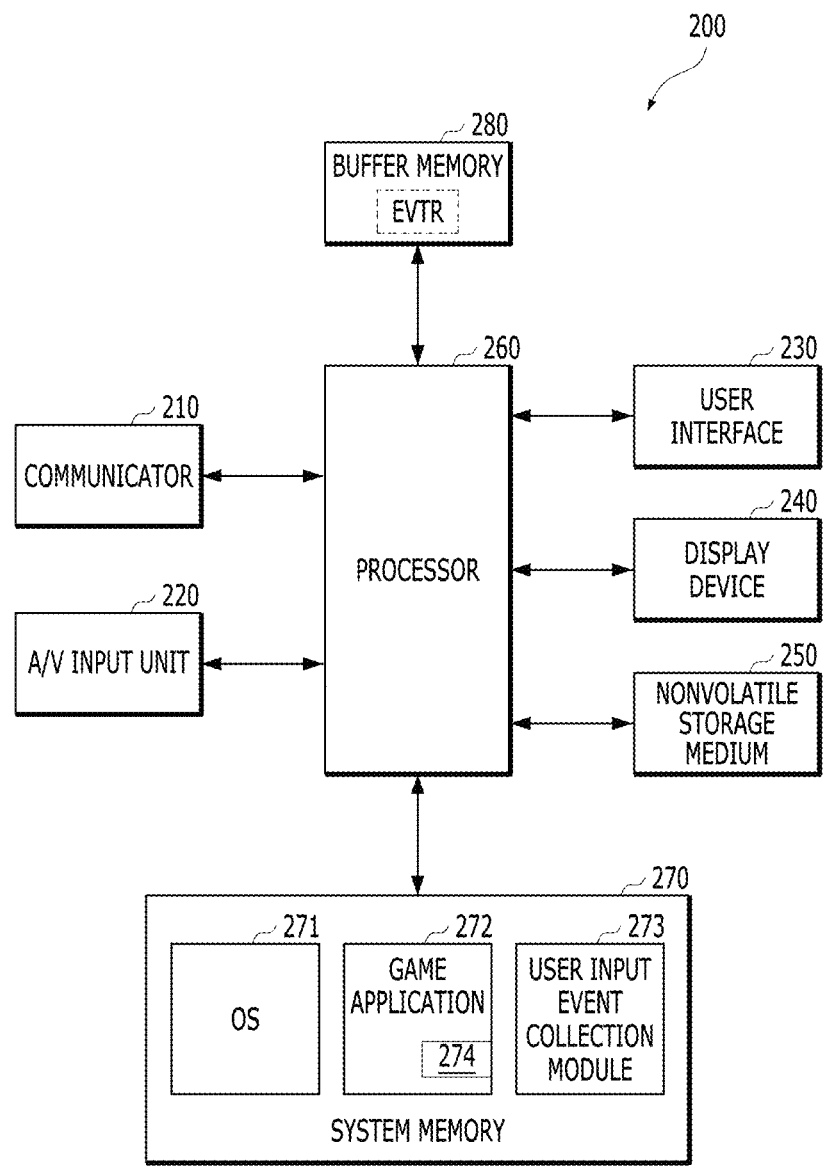
FIG. 4 is a diagram illustrating an embodiment of a user terminal which may provide an event history.

FIG. 4 is a diagram illustrating an embodiment of a user terminal 200 which may provide an event history. The user terminals 11-1 to 11-n may be implemented with the exemplary embodiment of the user terminal 200 of FIG. 4.

Referring to FIG. 4, the user terminal 200 may include a communicator 210, an audio/video (A/V) input unit 220, a user interface 230, a display device 240, a nonvolatile storage medium 250, a processor 260, and a system memory 270.

The communicator 210 may have at least one of a wired communication function and a wireless communication function, and thus may communicate with the game server 120 over the network 105 (refer to FIG. 1). In embodiments, the communicator 210 may communicate with the game server 120 by accessing wireless Internet, performing short-distance wireless communication such as Wi-Fi communication, or using any appropriate communication technology.

The A/V input unit 220 is for inputting an audio signal and a video signal. For instance, the A/V input unit 220 may include a camera. The camera processes an image obtained by an image sensor. The image processed by the camera may be stored in the system memory 270 and/or the nonvolatile storage medium 250 or may be transmitted to the game server 120 in association with a game service.

The user interface 230 receives a user input for controlling operations of the user terminal 200 or the processor 260. The user interface 230 may include, for example, but not limited to, a key pad, a dome switch, a touch pad (electrostatic/capacitive), a jog wheel, a jog switch, a finger mouse, and any device that is capable of receiving a user input. For instance, if the touch pad is integrated with the display device 240, this may be called a touch screen. In such a case, the user interface 230 may be visualized by the display device 240. Various types of user input events, for example, a touch, touch and hold, a drag, and a drag and drop may be received through the user interface 230.

The display device 240 operates under the control of the processor 260. The display device 240 displays information processed by the user terminal 200 or the processor 260. For example, the display device 240 may display a graphic interface under the control of the processor 260.

The display device 240 may include at least one of various types of display devices, such as a liquid crystal display, an organic light-emitting diode display, and a flexible display.

The nonvolatile storage medium 250 may be at least one of a flash memory type, a hard disk type, and a multimedia card. The nonvolatile storage medium 250 is configured to write and read data under the control of the processor 260.

The processor 260 may include any one of a general-purpose processor, a special purpose computer programmed to perform specific function and a dedicated processor. The processor 260 may be configured to control operations of the communicator 210, the A/V input unit 220, the user interface 230, the display device 240, the nonvolatile storage medium 250, and the system memory 270.

The system memory 270 may be provided as a working memory of the processor 260. In FIG. 4, the system memory 270 has been illustrated as an element separated from the processor 260. However, this is illustrative purposes only, and at least some of the system memory 270 may be included in the processor 260. Furthermore, the system memory 270 may include a plurality of memories which have been logically and/or physically separated. In embodiments, the system memory 270 may be provided as a buffer memory. In some embodiments, the system memory 270 may include at least one of a random access memory (RAM), a read only memory (ROM), and a storage medium readable by other types of computers.

The processor 260 is configured to load program codes or instructions from the nonvolatile storage medium 250 to the system memory 270 and to perform the operations and/or functions of the user terminal 200, described with reference to FIGS. 1 and 3, by executing the loaded program codes or instructions.

The processor 260 may load an operating system (OS) 271 onto the system memory 270 and execute the loaded OS 271. The OS 271 may provide an environment and/or interface in which a game application 272, a user input event collection module 273, and an interface module 274 may use at least one of the communicator 210, the A/V input unit 220, the user interface 230, the display device 240, the nonvolatile storage medium 250, and the system memory 270.

The processor 260 may load the game application 272 onto the system memory 270 and execute the loaded game application 272. The game application 272 may perform operations or actions for a game service in response to user input events. The user input events may be received through the user interface 230. The user input events may be generated by a macro which may be included in the user terminal 200.

Furthermore, the processor 260 may load, onto the system memory 270, the user input event collection module 273. The user input event collection module 273 may be configured to generate user input event units in response to user input events and to transmit the generated user input event units to the game server 120 as an event history, when the user input event collection module 273 is executed by the processor 260. The processor 260 may execute the loaded user input event collection module 273. The user input event collection module 273 may perform the operations and/or functions of the user terminal 200 described with reference to FIG. 3.

In some embodiments, the processor 260 may load, onto the system memory 270, the interface module 274. The processor 260 may be configured to collect user input events when the interface module 274 is executed by the processor 260. The processor 260 may execute the loaded interface module 274. For example, program codes and/or instructions of the interface module 274 may substitute some program codes and/or instructions of the game application 272. The substituted program codes and/or instructions may provide the user input event collection module 273 with user input events detected by the game application 272. For example, program codes and/or instructions of the interface module 274 are different from program codes and/or instructions of the game application 272, and may hook user input events detected by the game application 272 and provide the hooked user input events to the user input event collection module 273.

Figure 5:
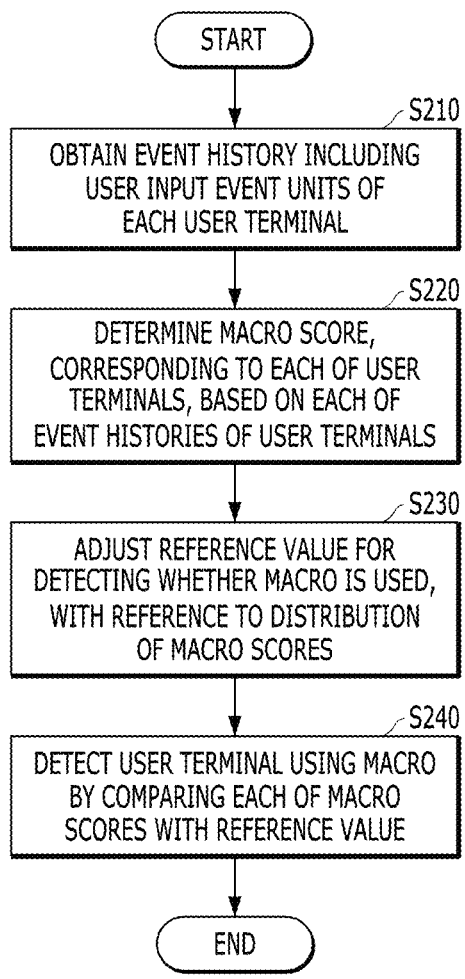
FIG. 5 is a flowchart illustrating a method of detecting a user terminal that uses a macro according to an embodiment of the present disclosure.
Figure 6:
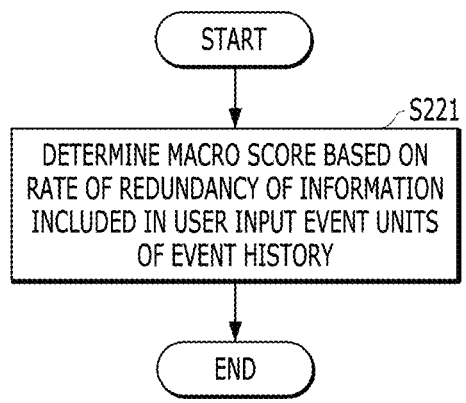
FIG. 6 is a flowchart illustrating a method of determining a macro score corresponding to each user terminal according to an embodiment of the present disclosure.
Figure 7:
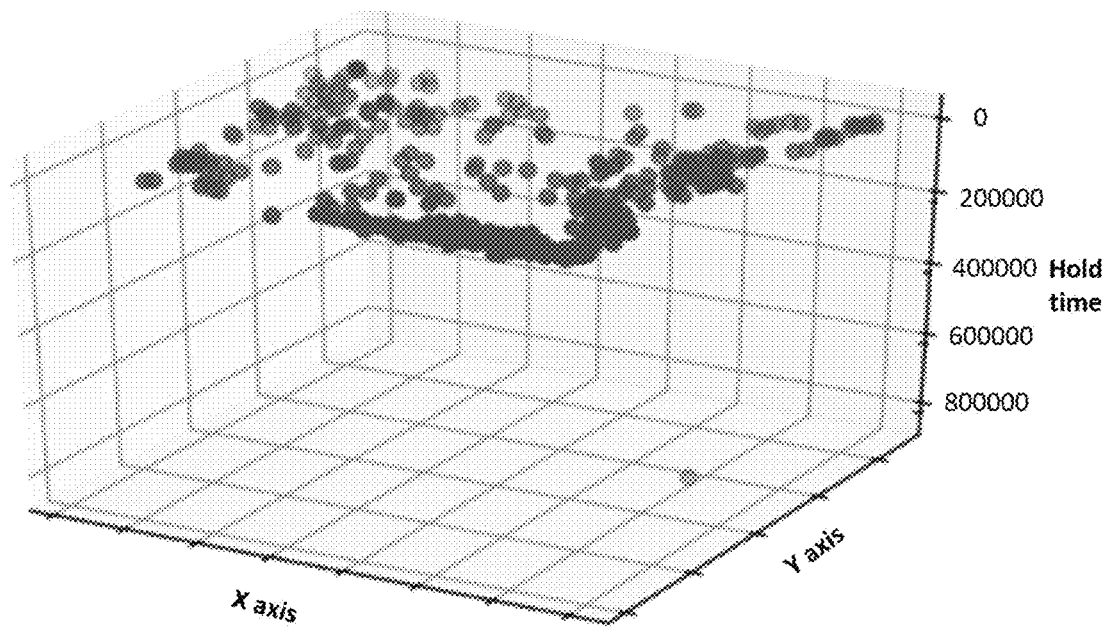
FIG. 7 is an example of coordinates and hold times of user input event units of one user terminal.
Figure 8:
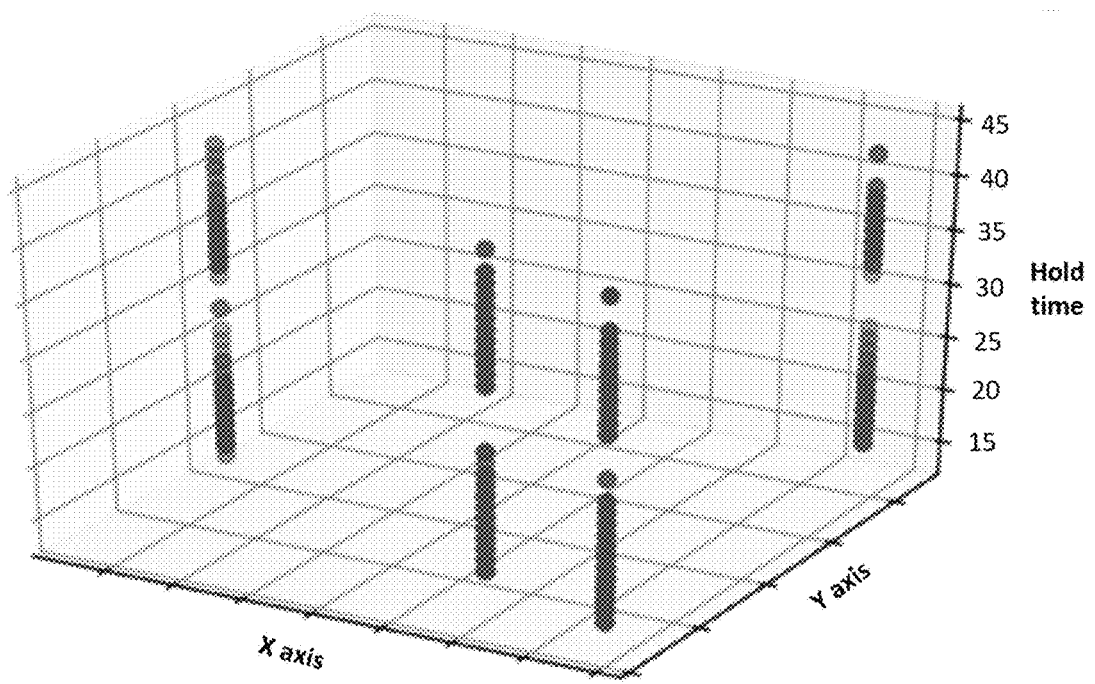
FIG. 8 is another example of coordinates and hold times of user input event units of another user terminal.
Figure 9:
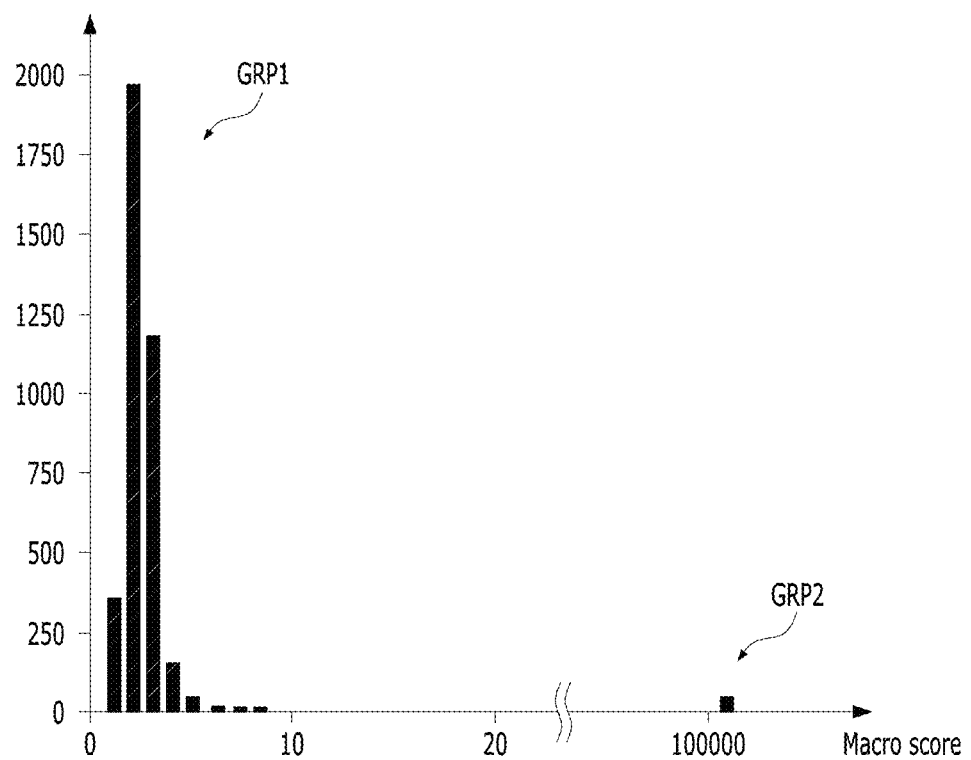
FIG. 9 is a graph illustrating a distribution of macro scores corresponding to user terminals according to an embodiment of the present disclosure.

FIG. 5 is a flowchart illustrating a method of detecting a user terminal that uses a macro according to an embodiment of the present disclosure. FIG. 6 is a flowchart illustrating a method of determining a macro score corresponding to each user terminal according to an embodiment of the present disclosure. FIG. 7 illustrates an example of coordinates and hold times of user input event units of a user terminal. FIG. 8 illustrates an example of coordinates and hold times of user input event units of another user terminal. FIG. 9 is a graph illustrating a distribution of macro scores corresponding to user terminals according to an embodiment of the present disclosure. In certain embodiments, operations of FIGS. 5 and 6 may be performed by the game server 120 of FIG. 1.

First, referring to FIGS. 1 and 5, at step S210, the game server 120 obtains an event history, including user input event units, from each of the first to n-th user terminals 11-1 to 11-n. Each of the user input event units may include various types of information capable of indicating user input events, for example, but not limited to, the coordinates of a user input event, a timestamp on which the user input event occurred, the hold time of the user input event, and the deadline time up to the generation of a current user input event after the generation of a previous user input event.

At step S220, the game server 120 determines a macro score, corresponding to each of the first to n-th user terminals 11-1 to 11-n, based on each of the event histories of the first to n-th user terminals 11-1 to 11-n. In an exemplary embodiment shown in FIG. 6, the macro score of each of the user terminals 11-1 to 11-n may be determined based on a rate of redundancy of information included in the user input event units of a corresponding event history (step S221). For example, the game server 120 may obtain information, such as coordinates, hold times and/or deadline times up to the generation of a current user input event after the generation of a previous user input event, from the user input event units, and may determine the macro score of a corresponding user terminal based on a rate of redundancy of the obtained information. For example, the j-th macro score of the j-th user terminal 11-j (j is an integer greater than 0 and smaller than or equal to n) may be determined according to Equation (1).

$$Sj = \frac{DPj}{DFj/NUIj} \quad (1)$$

In Equation (1), MSj indicates the j-th macro score of the j-th user terminal 11-j. DPj indicates the number of coordinates that are most redundant among the coordinates of the user input event units of the j-th user terminal 11-j. DFj indicates the number of coordinates that are different from each other among the coordinates of the user input event units of the j-th user terminal 11-j (i.e., the number of different coordinates determined by counting the number of redundant coordinates as one unit). NUIj indicates the number of user input event units of the j-th user terminal 11-j (i.e., the number of user input event units included in the event history of the j-th user terminal 11-j). In Equation (1), DPj is provided as a rate of redundancy of information included in the aforementioned user input event units. According to Equation 1, the j-th macro score of the j-th user terminal 11-j is increased as the number of coordinates most redundant among the coordinates of the user input events of the j-th user terminal 11-j is increased.

Referring to FIG. 7, the coordinates and hold times of the user input event units of a given user terminal may be distributed in various ranges. It may be understood that the coordinates and hold times illustrated in FIG. 7 correspond to a normal user who does not use a macro because the normal user provides various user input events while using a game service. In contrast, FIG. 8 shows the coordinates and hold times of the user input event units of another user terminal that have substantially repeated values or repeated patterns compared to FIG. 7. Accordingly, it may be understood that the coordinates and hold times in FIG. 8 correspond to a macro user who uses a macro because the macro user repeatedly provides specific user input events.

As described above, the macro score is determined based on a rate of redundancy of information included in the user input event units. Accordingly, the macro scores of normal users may be relatively low when it is considered that the normal users provide various user input events. In contrast, the macro score of a macro user may be relatively high. That is, a macro score may be increased as a rate of redundancy of information included in user input event units is increased. The macro score of the normal user may be lower than the macro score of the macro user. In the graph of FIG. 9, an x axis indicates a macro score, and a y axis indicates the number of users belonging to the range of each macro score. Macro scores of most of users, such as the users of a first group GRP1, are lower than a macro score of 10. In contrast, few or some users, such as the users of a second group GRP2, have macro scores higher than a macro score of 100000.

In FIG. 9, the macro scores of the first group GRP1 and the second group GRP2 are clearly distinguished for convenience of a description. However, normal users not using a macro may provide various user input events depending on various elements, such as each of the users and the characteristics of game service. Furthermore, a macro user may provide various user input events depending on various elements, such as the types of macros which may be used, the setting of a macro, and the characteristics of game service. Accordingly, a distribution of the macro scores in FIG. 9 may be variously changed. For example, in some embodiments, macro scores may not be clearly grouped.

Referring back to FIGS. 1 and 5, at step S230, the game server 120 adjusts the reference value RV for detecting whether a macro is used, with reference to a distribution of the determined macro scores. The game server 120 may determine the reference value RV by performing an operation using the macro scores. In some embodiments, the game server 120 may determine, as the reference value RV, a value that minimizes the sum of differences between the macro scores of the user terminals 11-1 to 11-n. Considering that user input events to be generated by a macro may be variously changed based on macro users, the types of macros which may be used and/or the characteristics of game service, the game server 120 can have enhanced reliability in determining a macro user by adjusting the reference value RV based on a distribution of macro scores. For example, in FIG. 9, the game server 120 may increase the reference value RV when the number of users belonging to, or categorized in, the second group GRP2 increases. That is, the reference value RV for detecting whether a macro is used may be increased as the number of users who have relatively high macro scores is increased. For example, in FIG. 9, when the number of users belonging to, or categorized in, the first group GRP1 increases, the game server 120 may decrease the reference value RV. As described above, the game server 120 may adaptively adjust the reference value RV based on a distribution of macro scores.

At step S240, the game server 120 detects, among the user terminals 11-1 to 11-n, a user terminal using a macro by comparing each of the macro scores of the user terminals 11-1 to 11-n with the reference value RV.

Figure 10:
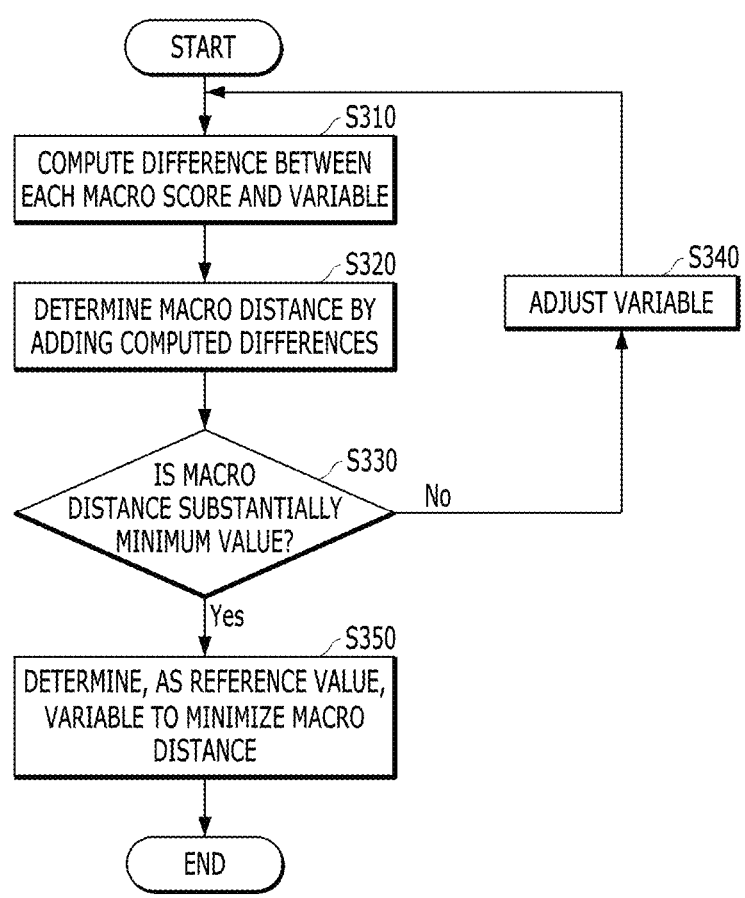
FIG. 10 is a flowchart illustrating a method of adjusting a reference value for detecting whether a macro is used according to an embodiment of the present disclosure.
Figure 11:
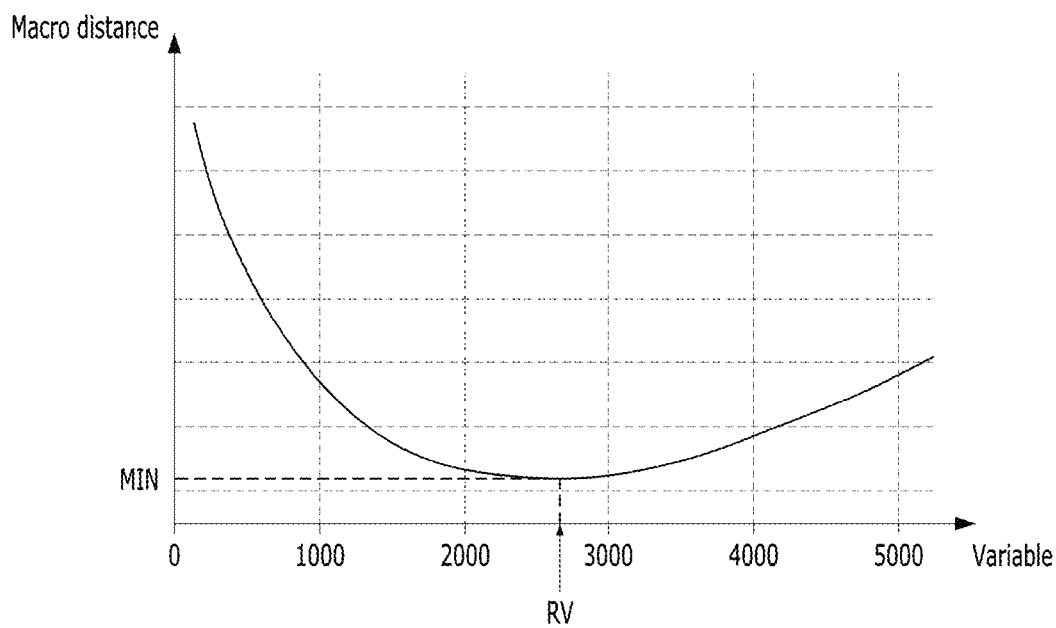
FIG. 11 is a graph illustrating a relation between a variable and a macro distance.

FIG. 10 is a flowchart illustrating a method of adjusting a reference value for detecting whether a macro is used according to an embodiment of the present disclosure. FIG. 11 is a graph illustrating a relation between a variable and a macro distance.

Referring to FIG. 10, at step S310, a difference between each macro score and a variable is computed. At step S320, a macro distance is determined by adding the differences computed at step S310. At step S330, step S340 or step S350 is selectively performed based on whether the determined macro distance is determined to substantially be a minimum value. For example, at step S330, whether the macro distance determined at step S320 is more than the minimum value is determined. When the macro distance determined at step S320 is less than the minimum value, the variable is adjusted (step S340). Steps S310, S320, S330 and S340 may be repeated until a minimum macro distance is substantially found.

The macro distance found through such repetitions may be represented like the graph of FIG. 11. Referring to FIG. 11, if users are classified into the first group GRP1 and the second group GRP2 based on the macro scores of the users as described with reference to FIG. 9, the macro distance may be decreased as the variable increases between 0 and a given value, and may be increased as the variable increases while becoming greater than the given value. In such a case, the macro distance has a minimum value MIN when the variable is equal to the given value. The given value may be determined as the reference value RV.

In such an embodiment, the reference value RV may increase as the number of users having relatively high macro scores (e.g., users belonging to the GRP2 in FIG. 9) increases. This may mean that the probability that user terminals will be categorized in a group of user terminals that use macros is increased. In contrast, the reference value RV may decrease as the number of users having relatively high macro scores (e.g., users belonging to the GRP2 in FIG. 9) decreases. This may mean that the probability that user terminals will be categorized in a group of user terminals that use macros is decreased. As described above, the reference value RV may be adaptively adjusted based on a distribution of macro scores. Considering that user input events generated by a macro may be variously changed based on macro users, the types of macros which may be used and/or the characteristics of game service, enhanced reliability in determining a macro user can be provided by adaptively adjusting the reference value RV based on a distribution of the macro scores. Furthermore, improved compatibility can be provided.

Referring back to FIG. 10, at step S350, a variable that minimizes the macro distance is determined as the reference value RV.

In some embodiments, the game server 120 may determine the reference value RV according to Equation (2).

$$MD = \operatorname{argmin}\left(\sum_{i=1}^{n} |xi - v|\right) \qquad (2)$$

In Equation 2, MD indicates the macro distance. xi indicates an i-th macro score. v indicates a variable. The argmin indicates a function for finding the value v that minimizes MD. In this case, n is an integer greater than 1, and i is an integer greater than 1 and smaller than or equal to n. As described above, the game server 120 may find the variable that minimizes the sum of differences between macro scores of the user terminals 11-1 to 11-n, and may determine the found variable as the reference value RV.

Figure 12:
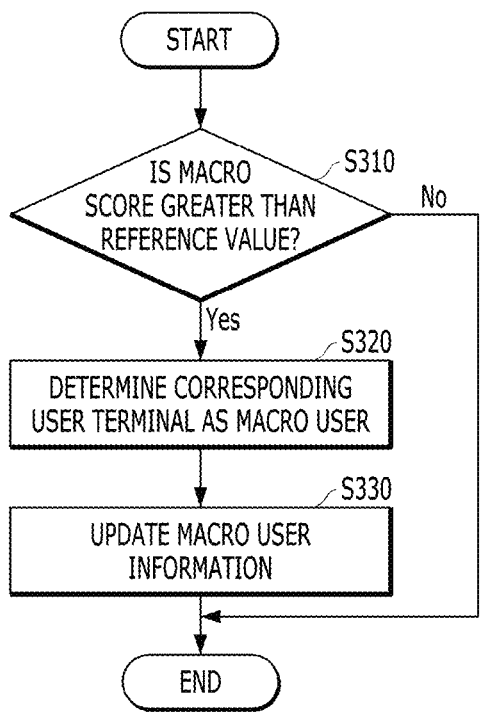
FIG. 12 is a flowchart illustrating an exemplary embodiment of step S240 in FIG. 5.

FIG. 12 is a flowchart illustrating an exemplary embodiment of step S240 in FIG. 5.

Referring to FIGS. 1 and 12, at step S310, the game server 120 determines whether a macro score is greater than the reference value RV. If, as a result of the determination, the macro score is greater than the reference value RV, step S320 is performed.

At step S320, the game server 120 determines a corresponding user terminal as a macro user or a user terminal using a macro. At step S330, the game server 120 may update the macro user information MCR so that the macro user information includes information indicative of the corresponding user terminal determined as a macro user or a user terminal using a macro.

The game server 120 may apply various policies to the corresponding user terminal determined as a macro user or a user terminal using a macro. The macro user information MCR may be referred to by the game service provider 124. For example, the game service provider 124 may be controlled to not provide at least some of a game service to a user terminal determined as a macro user.

Figure 13:
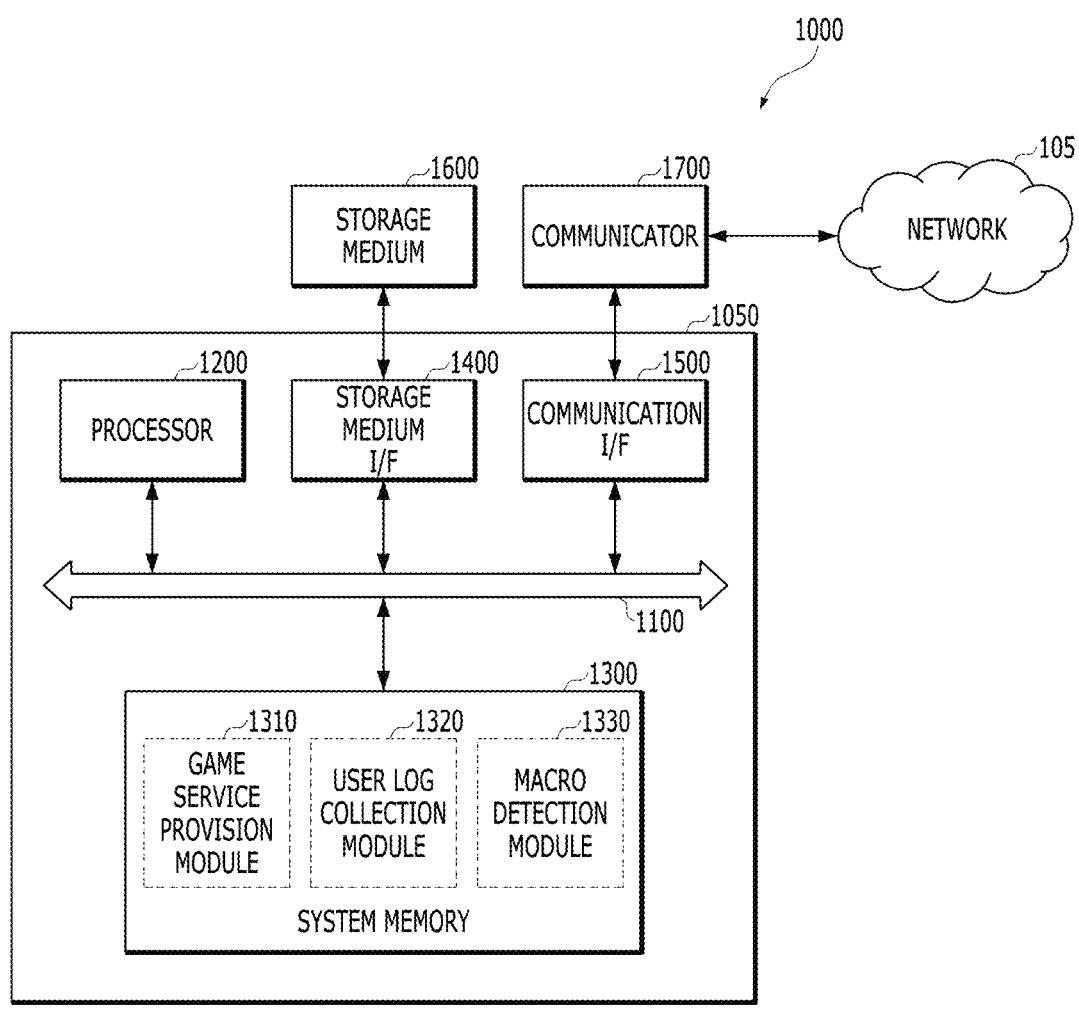
FIG. 13 is a block diagram illustrating a computer device suitable for implementing a network server according to an embodiment of the present disclosure.

FIG. 13 is a block diagram illustrating an embodiment of a computer device 1000 suitable for implementing the network server 120 of FIG. 1.

Referring to FIG. 13, the computer device 1000 includes a bus 1100, at least one processor 1200, a system memory 1300, a storage medium interface (I/F) 1400, a communication I/F 1500, a storage medium 1600, and a communicator 1700.

The bus 1100 is connected to the various elements of the computer device 1000, and transmits data, a signal, and information. The processor 1200 may be any one of a general-purpose processor, a special purpose computer programmed to perform specific function and a dedicated processor, and may control overall operations of the computer device 1000.

The processor 1200 is configured to load, onto the system memory 1300, program codes and instructions that provide various functions when the program codes and instructions are executed, and to process the loaded program codes and instructions. The system memory 1300 may be provided as a working memory of the processor 1200. In an embodiment, the system memory 1300 may include at least one of a random access memory (RAM), a read only memory (ROM), and a medium readable by another type of computer.

The processor 1200 may load, onto the system memory 1300, a game service provision module 1310 configured to provide the functions of the game service provider 124 illustrated in FIG. 1, a user log collection module 1320 configured to provide the functions of the user log collector 125 illustrated in FIG. 1, and a macro detection module 1330 configured to provide the functions of the macro detector 126 illustrated in FIG. 1, when the modules are executed by the processor 1200. Such program codes and/or instructions may be executed by the processor 1200, and may perform the operations of the game service provider 124, the user log collector 125, and the macro detector 126 described with reference to FIG. 1.

In addition, the system memory 1300 may function as a buffer memory for the game service provider 124, the user log collector 125, and the macro detector 126. In FIG. 13, the system memory 1300 has been illustrated as a configuration separated from the processor 1200, but at least some or all elements of the system memory 1300 may be included in the processor 1200. In some embodiments, the system memory 1300 may be provided as a plurality of memories that are physically and/or logically separated from each other.

The program codes and/or instructions may be loaded from the storage medium 1600, that is, a recording medium readable by a separate computer, to the system memory 1300. Alternatively, the program codes and/or instructions may be loaded from the outside of the computer device 1000 to the system memory 1300 through the communicator 1700.

The storage medium I/F 1400 is connected to the storage medium 1600. The storage medium I/F 1400 may interface between the processor 1200 connected to the bus 1100 and another element, such as the system memory 1300, and the storage medium 1600. The communication I/F 1500 is connected to the communicator 1700. The communication I/F 1500 may interface between the communicator 1700 and elements connected to the bus 1100.

In certain embodiments, the bus 1100, the processor 1200, and the system memory 1300 may be integrated into a single board 1050. For example, the bus 1100, the processor 1200, and the system memory 1300 may be mounted on a single semiconductor chip. In some embodiments, the board 1050 may further include the storage medium I/F 1400 and the communication I/F 1500.

The storage medium 1600 may include various types of nonvolatile storage media, for example, a flash memory and a hard disk, which retain data stored therein although power is cut off. The storage medium 1600 may be provided as the storage medium 122 in FIG. 1. In such a case, the storage medium 1600 may store the user log data ULD, the reference value RV, and the macro user information MCR illustrated in FIG. 1.

The communicator 1700 (or transceiver) may transmit and receive signals between other devices and/or servers within the computer device 1000 and the network system 100 (refer to FIG. 1) over the network 105. The communicator 1700 may be provided as the communicator 121 in FIG. 1.

According to some embodiments of the present disclosure, there can be provided the network server having enhanced reliability in determining macro users among user terminals using a game service and the operation method thereof.

While having been described herein, specific embodiments and application examples have been provided to merely help more general understanding of the present disclosure, and the present disclosure is not limited to the embodiments. A person having ordinary knowledge in the art to which the present disclosure pertains may change or modify the present disclosure in various ways based on the foregoing description.

Accordingly, the spirit of the present disclosure should not be determined based on only the described embodiments, and all changes equivalents to the claims and equivalent modifications thereof may be construed as belonging to the category of the spirit of the present disclosure.

What is claimed is:

1. A network server communicating with a plurality of user terminals over a network, the network server comprising:
   a communicator;
   a system memory; and
   at least one processor configured to communicate with the plurality of user terminals through the communicator, wherein the at least one processor is configured to:
   obtain event histories of the plurality of user terminals by communicating with the plurality of user terminals through the communicator, each of the event histories comprising information on user input events of each of the plurality of user terminals;
   determine macro scores corresponding to the plurality of user terminals, respectively, based on each of the event histories of the plurality of user terminals;
   adjust a reference value for detecting whether each of the plurality of user terminals uses a macro based on the macro scores corresponding to the plurality of user terminals; and
   detect whether each of the plurality of user terminals uses the macro, by comparing each of the macro scores corresponding to the plurality of user terminals with the reference value.

2. The network server of claim 1, wherein the at least one processor is configured to determine, as the reference value, a value that minimizes a sum of differences between the macro scores corresponding to the plurality of user terminals.

3. The network server of claim 1, wherein:
   the macro scores comprise first to n-th macro scores,
   the at least one processor is configured to determine the reference value by using an equation:

$$MD = \sum_{i=1}^{n} |xi - v|,$$

wherein MD indicates a macro distance, xi indicates an i-th macro score, v indicates a variable, n is an integer greater than or equal to 1, and i is an integer greater than or equal to 1 or smaller than or equal to n, and the variable that minimizes the macro distance is determined as the reference value.

4. The network server of claim 1, wherein the at least one processor is configured to detect, among the plurality of user terminals, a user terminal which has used the macro by checking whether each of the macro scores corresponding to the plurality of user terminals is greater than the reference value.

5. The network server of claim 1, wherein the information on the user input events comprises touch coordinates and hold times of the user input events.

6. The network server of claim 1, wherein the at least one processor is configured to determine each of the macro scores corresponding to the user terminals based on a rate of redundancy of the information on the user input events of each of the plurality of user terminals obtained from each of the event histories.

7. The network server of claim 1, wherein the at least one processor is configured to:
obtain coordinates of the user input events of each of the user terminals from each of the event histories, and
determine each of the macro scores corresponding to the plurality of user terminals based on redundant coordinates among the obtained coordinates of the user input events.

8. The network server of claim 1, wherein:
the plurality of user terminals comprise first to n-th user terminals,
the macro scores comprise first to n-th macro scores,
the at least one processor is configured to determine a j-th macro score of a j-th user terminal by using an equation:

$$MSj = \frac{DPj}{DFj/NUIj},$$

wherein n is an integer greater than or equal to 1, j is an integer greater than or equal to 1 or smaller than or equal to n, MSj indicates the j-th macro score, DPj indicates the number of coordinates most redundant among coordinates of user input events of the j-th user terminal, DFj indicates the number of different coordinates among the coordinates of the user input events of the j-th user terminal, and NUIj indicates a number of the user input events of the j-th user terminal.

9. A network server communicating with a plurality of user terminals over a network, the network server comprising:
a communicator;
a system memory; and
at least one processor configured to communicate with the plurality of user terminals through the communicator, wherein the at least one processor is configured to:
obtain each of event histories comprising information on user input events of each of the plurality of user terminals;
determine each of macro scores corresponding to each of the plurality of user terminals based on each of the event histories of the plurality of user terminals;
adjust a reference value for detecting whether each of the plurality of user terminals uses a macro, based on a distribution of the macro scores; and
detect whether each of the plurality of user terminals uses the macro, by comparing each of the macro scores corresponding to each of the plurality of user terminals with the reference value.

10. The network server of claim 9, wherein the at least one processor is configured to determine, as the reference value, a value that minimizes a sum of differences between the macro scores corresponding to the plurality of user terminals.

11. A method of operating a network server communicating with a plurality of user terminals over a network, the method comprising:
obtaining event histories by communicating with each of the plurality of user terminals over the network, each of the event histories comprising information on user input events of each of the plurality of user terminals;
determining macro scores corresponding to the plurality of user terminals, respectively, based on each of the event histories of the plurality of user terminals;
adjusting a reference value for detecting whether each of the plurality of user terminals uses a macro based on the macro scores corresponding to the plurality of user terminals; and
detecting whether each of the plurality of user terminals uses the macro, by comparing each of the macro scores corresponding to the plurality of user terminals with the reference value.

12. The operating method of claim 11, wherein the adjusting of the reference value comprises determining, as the reference value, a value that minimizes a sum of differences between the macro scores corresponding to the plurality of user terminals.

13. The operating method of claim 11, wherein:
the macro scores comprise first to n-th macro scores,
the reference value is adjusted by using an equation:

$$MD = \sum_{i=1}^{n} |xi - v|,$$

wherein MD indicates a macro distance, xi indicates an i-th macro score, v indicates a variable, n is an integer greater than or equal to 1, and i is an integer greater than or equal to 1 or smaller than or equal to the n, and
the variable that minimizes the macro distance is determined as the reference value.

14. The operating method of claim 11, wherein a user terminal corresponding to a macro score greater than the reference value among the plurality of user terminals is determined as a user terminal that uses the macro.

15. The operating method of claim 11, wherein the information on the user input events comprises touch coordinates and hold times of the user input events.

16. The operating method of claim 11, wherein the determining of each of the macro scores comprises determining each of the macro scores corresponding to the plurality of user terminals based on a rate of redundancy of the information on the user input events of each of the plurality of user terminals obtained from each of the event histories.

* * * * *